Aug. 29, 1967  L. L. KESSLER  3,339,079
LOAD DEMAND PROGRAM CONTROL
Filed July 1, 1964  7 Sheets-Sheet 5

United States Patent Office 3,339,079
Patented Aug. 29, 1967

3,339,079
LOAD DEMAND PROGRAM CONTROL
Leland L. Kessler, Lima, Ohio, assignor to Westinghouse Electric Corporation, East Pittsburgh, Pa., a corporation of Pennsylvania
Filed July 1, 1964, Ser. No. 379,779
5 Claims. (Cl. 307—29)

ABSTRACT OF THE DISCLOSURE

A load demand program control for electrical power systems for adding to and removing electrical generating stations from an electrical bus, in response to the magnitude of the load connected to the electrical bus.

---

In alternating current power systems having a plurality of parallel connected alternating current generators for on-site power generation, the operating costs are a significant portion of the total cost. Since system efficiency directly affects operating cost, it is desirable that the system efficiency be maintained as high as possible. Maximum efficiency is obtained when the alternating current generators and their associated prime movers are operating at or near rated load, and since the electrical load in the system may vary, it is desirable to automatically start and stop the alternating current generators responsive to the load conditions, to maintain, as nearly as possible, rated load on each alternating current generator connected to the distribution bus. Thus, it is desirable to have load demand program control apparatus that will measure the total power delivered to the system and determine the minimum number of alternating current generators that are required to supply the electrical power demand. The proper number of alternating current generators should be automatically added to, or removed from, the system in response to such a determination when more or less capacity is required. The generators should be added and removed at predetermined power levels, with a 'deadband' of sufficient width between adding and removing a generator to prevent system instability. For flexibility, the add and remove power levels should be independently adjustable for each generator.

In addition to automatically adding and removing generating stations at predetermined power levels, it is desirable that the program control apparatus have a number of additional features. Suitable time delays should be provided in the add and remove circuits to override load transients. After a station start has been initiated, the load sensing circuit should be disabled for a time sufficient to allow the station to be connected to the bus. In other words, the program control must wait and see if the station satisfies the demand before it adds additional stations. If the station fails to come on the bus after the station start has been initiated, the next available station should be added. The program controls should automatically bypass inoperative stations or stations already on the line. If at any time a generating station is required and none are available, the program control should produce an alarm signal which persists until the demand has reduced to a point where another generating station is not required. If a station fails while operating for some reason, the program control should replace the failed station with the next available station. Further, all of the adding of the stations should be accomplished sequentially and they should be removed in the order in which they were added.

According, it is object of this invention to provide new and improved load demand program control for a plurality of parallel connected electrical generating stations.

Another object of the invention is to provide a new and improved load demand program control for sequentially adding and removing generating stations from the distribution bus in response to the power demands to maintain maximum system operating efficiency.

A further object of the invention is to provide a new and improved load demand program control for a multi-unit electrical generating system which has suitable time delays in the add and a remove circuits for overriding load transients, and a sufficient "deadband" between the add and remove power levels to provide system stability.

Still another object of the invention is to provide new and improved load demand program control for multi-unit electrical generating systems which automatically by-passes inoperative stations and stations already on the line when it is adding additional stations.

Another object of the invention is to provide new and improved load demand program control for a multi-unit electrical generating system which waits a predetermined time after signalling a generating station to be connected to the electrical bus, to determine if this station satisfies the demand before adding additional stations.

A further object of the invention is to provide a new and improved load demand program control for a multi-unit electrical generating system which will add the next available station to the line if the station signalled fails to come on the line, or fails to satisfy the demand, or fails after coming on the line, and if at any time an additional station is not available when required, to provide an alarm signal which continues until the demand drops within the available capacity.

Briefly, the present invention accomplishes the above-cited objects by providing load demand sensing means which provides a unidirectional signal proportional to the real component of the load current. Station counting means changes the sensitivity of the load demand sensing means as a function of the number of stations that are connected to the electrical bus. This allows individual adjustment of the add and remove power levels for each of the generating stations. A stepping switch is provided which, after a suitable time delay, advances one position when the load demand sensing means determines that a station must be added or removed. An add-remove latching type relay responsive to the load demand sensing means, latches in an "add" or "remove" position, depending upon its command. Pulse forming means generates a unidirectional pulse each time the stepping switch advances to a new position. This pulse is directed to either the add or the remove circuits depending upon the position of the add-remove latching relay, and the pulse is directed to the proper output and generating station by the stepping switch. The output signal from the stepping switch is also directed to logic routing means which senses the position of the add-remove relay, the position of the stepping switch, the number of inoperative stations and the number of stations already on the line. It performs the function of by-passing inoperative stations and stations already on the line when adding stations, and of by-passing stations already off the line when removing stations. It also performs the function of disabling the add circuit for a predetermined period of time after a station has been signalled to be added, to the electrical bus. Without this feature, all of the remaining stations would be added during the station start interval. Alarm means produces a signal when all available stations are connected to the electrical bus and the load demand means signals that another station is required. The alarm signal continues until such time that the load demand drops within the available capacity.

Further objects and advantages of the invention will become apparent as the following description proceeds, and features of novelty which characterize the invention will be pointed out in particularity in the claims annexed to and forming a part of this specification.

For a better understanding of the invention, reference may be had to the accompanying drawings in which:

FIGURES 1, 1A, and 1B are block diagrams, partially schematic, showing the invention in simplified form;

Figure 1A:
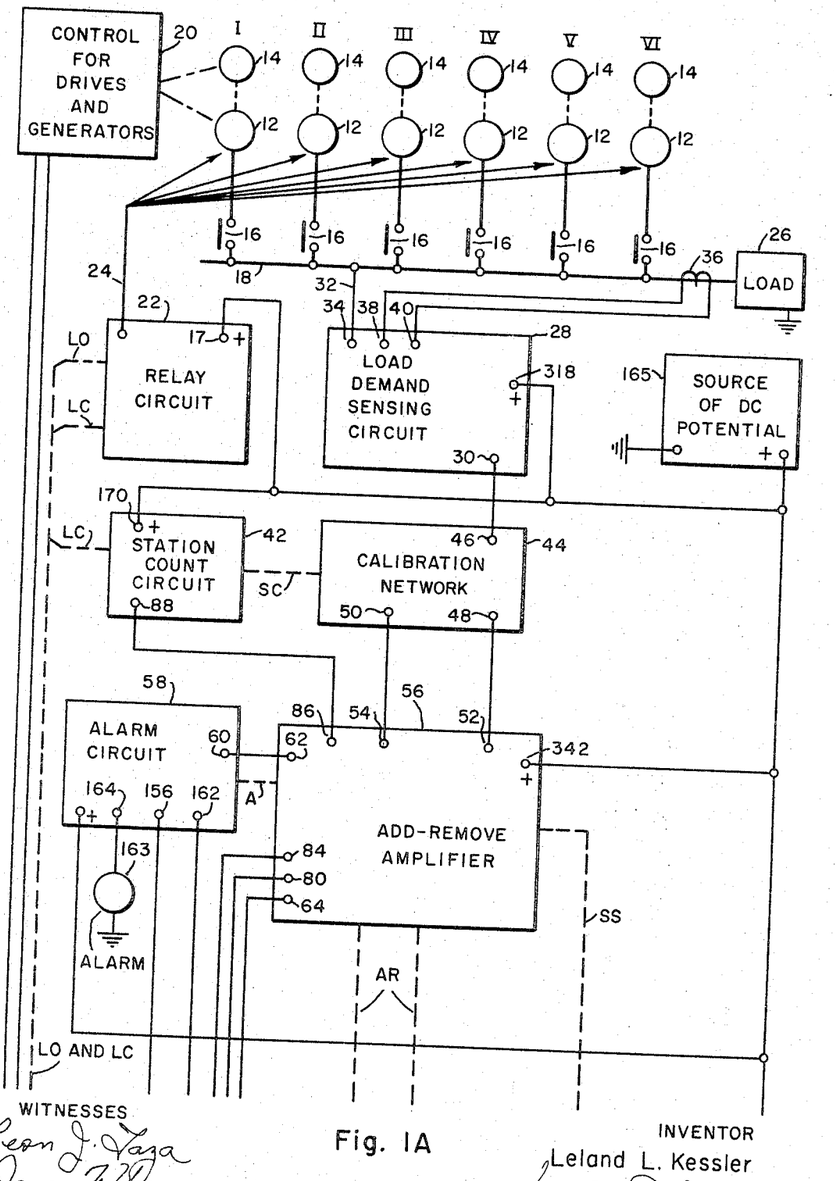
Figure 1B:
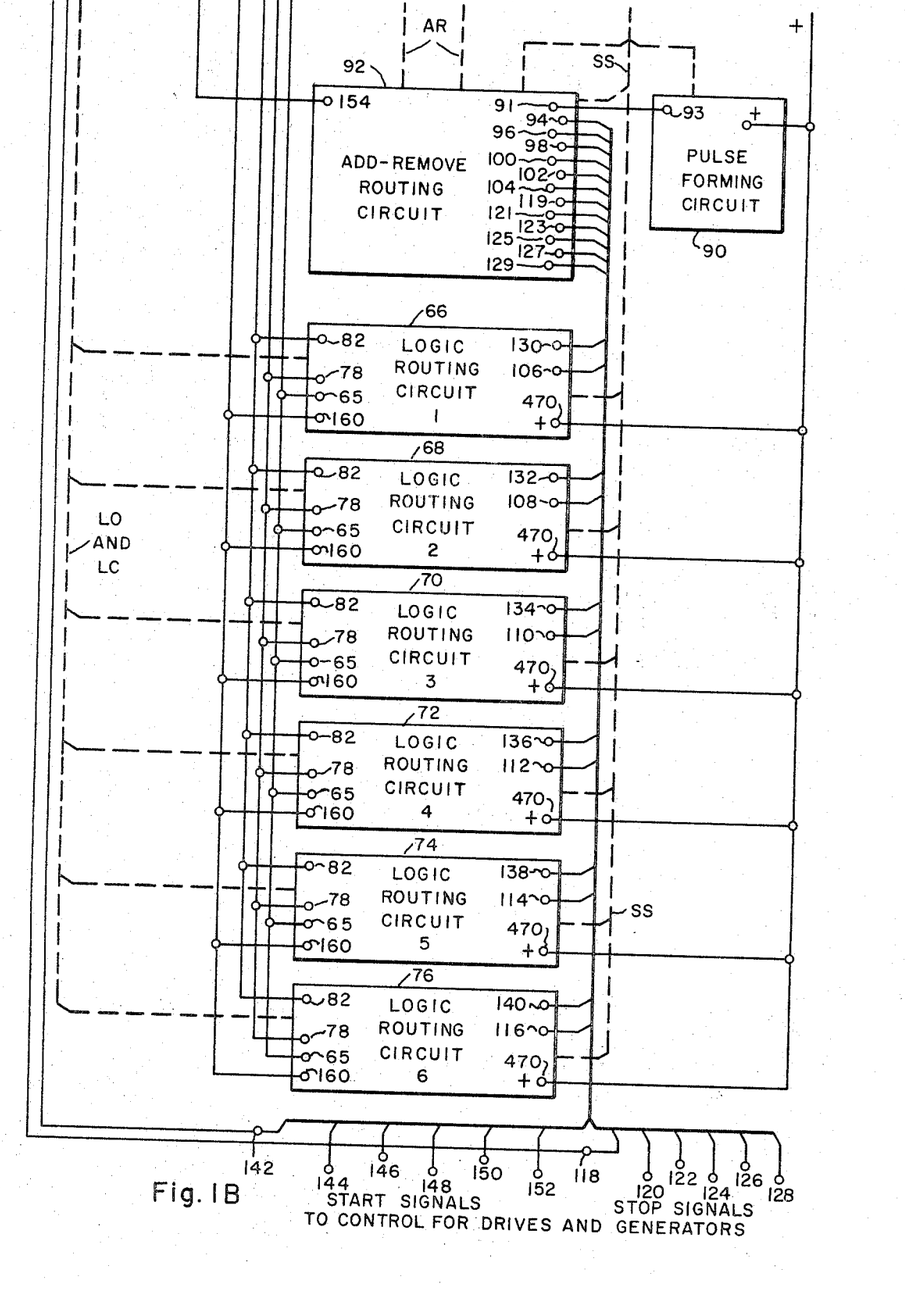
Figure 1C:
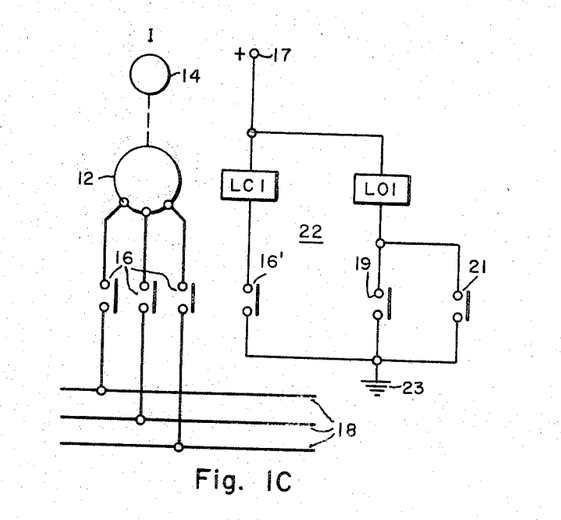
FIGURE 1C is a schematic diagram showing how the slave and lock-out relays may be connected.

Referring now to the drawings, and FIGS. 1A, 1B, and 1C in particular, there is illustrated a partially schematic, partially block diagram of a complete load demand program control apparatus constructed according to the teachings of this invention. The solid lines indicate actual electrical connections between the various circuits and the broken lines indicate that a circuit having a relay coil, or coils, has contacts from that relay, or relays, in other circuits. For purposes of explanation, it will be assumed that the number of generating stations in the system is six, however, it will be understood that the invention is applicable to any plurality of generating stations. The six generating stations are indicated with Roman numerals I through VI, with each generating station comprising an alternating current generator 12, driving means, such as a turbine 14, and circuit making and breaking means, such as contactor 16.

The generating stations I through VI are connected in parallel circuit relation with a load 26 through alternating current bus 18. The electrical conductors from the generating stations I through VI and alternating current bus 18 are shown in the simplified one line form, but it is to be understood they may be either single or polyphase.

The control 20 for the alternating current generators 12 and driving means 14 is conventional and since it forms no part of the invention, it will not be further shown or described.

In order to provide information concerning the status of generating stations I through VI for the load demand program control system, slave relays LC and lockout relays LO, designated generally by the numeral 22, are connected in circuit relation with the generating stations I through VI through electrical conductors which are designated by the single conductor 24. There is one LC slave relay for each generating station, designated LC1 through LC6 corresponding to the Roman numeral of its associated generating station, and they are energized when their associated contactor 16 is energized. There is also one LO lockout relay for each generating station, designated LO1 through LO6 corresponding to the Roman numeral of its associated generating station, and they are energized when their associated generating station fails. FIG. 1C illustrates how LC1 and LO1 relays may be connected relative to generating station I. Slave relay LC1 is operated through an auxiliary contact 16' on line contactor 16. When contactor 16 closes, auxiliary contact 16' closes, completing the circuit from terminal 17, which is connected to a source of direct current potential, to ground 23, thus energizing slave relay LC1. Lockout relay LO1 is responsive to contacts 19 and 21. Contact 19 closes when generator I fails. Also an over or undervoltage condition will cause contact 19 to close. Contact 21 closes when driving means A fails to come up to normal speed within a predetermined time after station I has been signalled to come on the line. The closing of either contact 19 or 21 energizes lockout relay LO1, connecting lockout relay LO1 to ground 23 and direct current potential at terminal 17.

In order to obtain a signal proportional to the power being delivered to the load 26, a load demand sensing circuit 28 is provided which produces a unidirectional signal at its output terminal 30 proportional to the product of the line voltage E and the in-phase vector of the line current I [EI cos $\theta$]. A signal proportional to the line voltage E is obtained by conductor 32 connecting bus 18 with the load demand sensing circuit 28 at terminal 34. A current transformer 36, disposed in inductive relation with electrical bus 18, delivers a signal proportional to the total line current to terminals 38 and 40.

In order to individually adjust the add and remove power levels for each of the generating stations I through VI, it is necessary to change the sensitivity of the load demand sensing circuit as a function of the number of generating stations that are connected to the electrical bus 18. This is accomplished by station count circuit 42 and calibration network 44. As shown in detail in FIG. 2, contacts $LC1_a$ through $LC6_a$ and $LC1_b$ through $LC6_b$ of slave relays LC are connected in the station count circuit 42 and function to change the potential applied to station count relays designated SC1 through SC6, in response to the number of line contactors 16 that are closed. Station count relays SC1 through SC6 are responsive to the number of line contactors 16, closed, such that a different station count relay SC1 through SC6 will be actuated for each number of line contactors 16 that are closed.

Contacts $SC1_b$ through $SC6_b$ of station count relays SC1 through SC6 are located in the calibration network 44. This is shown in detail in FIG. 3. Calibration network 44 allows the power level at which each generating station is added and removed to be individually adjusted.

The signal from output terminal 30 of load demand sensing circuit 28 is applied to terminal 46 of calibration network 44, and this signal is directed through the particular portion of the calibration network 44 corresponding to the station count relay SC that is energized. This signal appears, after being modified in the "add" portion of the calibration network 44, at output terminal 48, and the signal also appears at output terminal 50, after being modified in the "remove" portion of calibration network 44. The add and remove signals from terminals 48 and 50, respectively, of calibration network 44 are applied to input terminals 52 and 54, respectively, of add-remove amplifier circuit 56.

Figure 5:
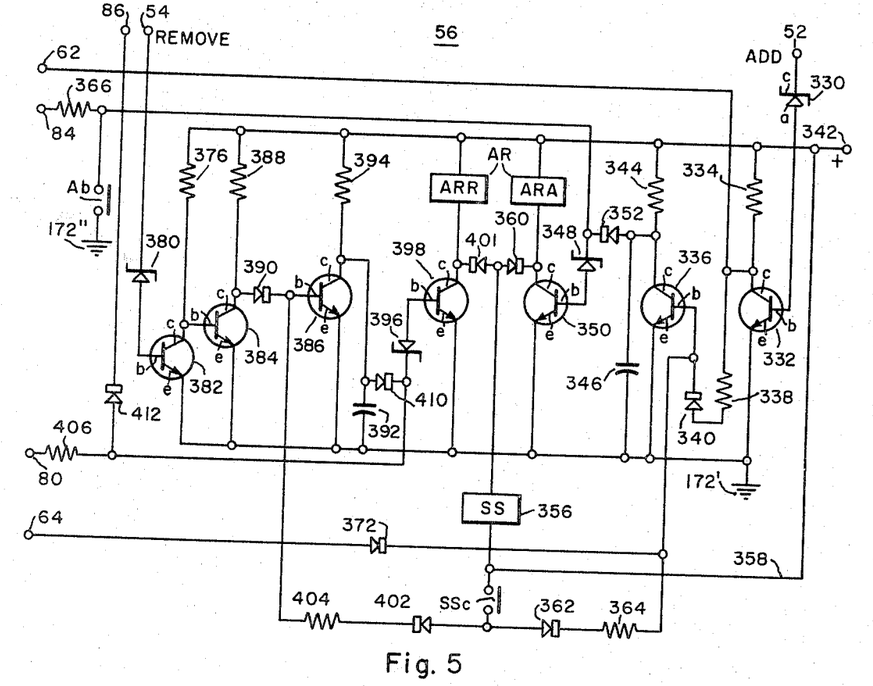
FIGURE 5 is a schematic diagram of an add-remove amplifier which includes a stepping switch and add-remove latching relay.

The add-remove amplifier circuit 56, shown in detail in FIG. 5, contains a latching type relay AR with an "add" coil and a "remove" coil. The add-remove amplifier circuit 56 also contains a stepping switch SS which advances one position, after a suitable time delay, each time that the load demand sensing circuit 28 determines that a generating station should be added to, or removed from, the electrical bus 18. If the signal from terminal 48 of calibration network 44 is such that a generating station must be added, current will flow through the "add" coil of latching relay AR and the relay AR will latch in the "add" position. The coil of stepping switch SS will also be energized, and it advances one position when the coil is de-energized, after a predetermined time delay.

The plurality of contacts on the stepping switch SS correspond to the plurality of generating stations, and the particular position of the stepping switch at the time of the "add" signal determines which generating station is to be added. A similar sequence occurs when a station is to be removed, with the latching relay AR latching in the "remove" position. When all available stations are on the line and an additional station is required, an alarm relay A, located in alarm circuit 58 shown in detail in FIG. 10, prevents the stepping switch SS from advancing, by a connection from terminal 60 of alarm circuit 58 to terminal 62 of add-remove amplifier circuit 56. The add-remove amplifier 56 also performs the function of disabling the "add" circuit during the time a generating station is being connected to the electrical bus 18. This function is performed when an "add hold" signal is applied to terminal 64 of add-remove amplifier 56 from terminals 65 of logic routing circuits 66, 68, 70, 72, 74 and 76. The signal for by-passing a station, when a generating station is to be removed, is applied from terminals 78 of logic routing circuits 66, 68, 70, 72, 74 and 76, to terminal 80 of add-remove amplifier 56. The signal for bypassing an inoperative station or station already on the line when a generating station is to be added, is applied from terminals 82 of logic routing circuits 66, 68, 70, 72, 74 and 76, to terminal 84 of add-remove amplifier 56.

In order to disable the "remove" circuit when only one station remains on the line, and thus keep at least one station on the line even though the power demand reduces to zero, the "remove" circuit portion of the add-remove amplifier 56 is connected from terminal 86, to terminal 88 on the station count circuit 42. Terminal 88 is grounded when only one generating station is on the line, thus grounding and rendering inoperative the station "remove" circuit of add-remove amplifier 56.

Figure 6:
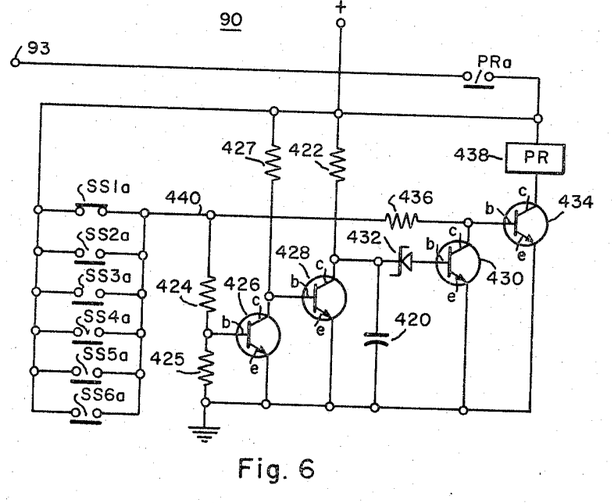
FIGURE 6 is a schematic diagram of a pulse forming circuit which produces a unidirectional pulse each time the stepping switch of FIG. 5 advances to a new position.

Pulse forming circuit 90, shown in detail in FIG. 6, generates a unidirectional pulse each time the stepping switch SS in the add-remove amplifier 56 advances to a new position, with stepping switch contacts $SS1_a$ through $SS6_a$ being connected in the pulse forming circuit 90. A pulse relay PR in pulse forming circuit 90 is energized when the stepping switch SS reaches its new position, causing a pulse to be applied from terminal 93 of pulse forming circuit 90, to terminal 91 of add-remove routing circuit 92. The add-remove routing circuit 92 is shown in detail in FIG. 8.

When the load demand sensing circuit 28 senses that a generating station must be added or removed, the stepping switch SS in add-remove amplifier 56 advances one step, the add-remove relay AR in add-remove amplifier circuit 56 assumes either the "add" or "remove" position, depending upon the information from the load sensing circuit 28, and a pulse is produced by pulse relay PR in pulse forming circuit 90. The add-remove routing circuit 92 routes the pulse to the proper set of out-puts, "add" or "remove," through the contacts ARA2 or ARR2, respectively, of add-remove relay AR, and the stepping switch SS routes the pulse to the proper generating station through stepping switch contacts $SS1_b$ through $SS6_b$ or $SS1_c$ through $SS6_c$.

Output terminals 94, 96, 98, 100, 102 and 104 of add-remove routing circuit 92 direct "remove" pulses to the terminals 106, 108, 110, 112, 114 and 116 of logic routing circuits 66, 68, 70, 72, 74 and 76, respectively, and to the control 20 of generating stations I through VI, respectively, through output terminals 118, 120, 122, 124, 126 and 128, respectively.

Output terminals 119, 121, 123, 125, 127, and 129 of add-remove routing circuit 92 connect the "add" pulses to terminals 130, 132, 134, 136, 138 and 140 of logic routing circuits 66, 68, 70, 72, 74 and 76, respectively, and to generating stations I through VI through output terminals 142, 144, 146, 148, 150 and 152, respectively.

When all available generating stations are connected to the electrical bus 18 and another generating station is required, the "add" pulse is directed from terminal 154 of add-remove routing circuit 92 to terminal 156 of alarm circuit 58.

Logic routing circuits 66, 68, 70, 72, 74 and 76 sense the positions of the add-remove relay AR, the stepping switch SS located in the add-remove amplifier 56, and the contacts of the line contactor slave relays LC and lock-out relays LO, advancing stepping switch SS to its next position when the position selected is connected to a generating station which is unable to perform the "add" or "remove" command.

In addition to aiding the functions of by-passing inoperative stations and stations already on the line when adding a station, by-passing stations already off the line when removing stations, and waiting a predetermined time after a "start" signal has been given to a generating station, logic routing circuits 66, 68, 70, 72, 74 and 76 also "arm" the alarm circuit 58 by indicating from its terminals 160, to terminal 162 of alarm circuit 58, when all of the available generating stations are connected to the electrical bus 18.

The alarm circuit 58 contains an alarm relay A which is energized when all available generating stations are on the line, as signalled by logic routing circuits 66, 68, 70, 72, 74 and 76, and another generating station is required, as signalled by the add-remove routing circuit 92. When the alarm relay A is energized, alarm 163 is energized from terminal 164.

A source of unidirectional control potential 165 is provided, with its application to the various control circuits being designated with a plus (+) mark at the various terminals.

The function of the various circuits which comprise the invention, and their interrelationships, having been enumerated, circuits which may perform these functions will now be described in detail.

For purposes of illustration, we have assumed there are 6 generating stations. For further illustration of the various circuits which comprise the load demand program control, we will assume that the capacity of each generating station is 300 kw. and that an additional station should be added when the load demand is within 50 kw. of the total capacity of the generating stations connected to the electrical bus 18. For purposes of system stability, we will further assume that the "deadband" between the power levels at which a generating station is added and the power level at which a generating station is removed, is 10 kw. The following table, Table I, will then indicate when the next generating station is to be added.

TABLE I

| Number of Stations Connected to Line N | Total kw. Available | (N+1) Station (kw.) is added when demand is— |
|---|---|---|
| 1 | 300 | 250 |
| 2 | 600 | 550 |
| 3 | 900 | 850 |
| 4 | 1,200 | 1,150 |
| 5 | 1,500 | 1,450 |
| 6 | 1,800 | (*) |

*(N+1) station is not available.

Table II illustrates the power levels at which the stations are removed from the electrical bus, with the "dead-band" being clear by comparing Tables I and II. For example, a third station would be added to the electrical bus when the power demand reaches 550 kw., while a third station would not be removed from the electrical bus until the power demand drops to 540 kw.

TABLE II

| N: | The "Nth" station is removed when the demand is |
|---|---|
| 1 | (1) |
| 2 | 240 kw. |
| 3 | 540 kw. |
| 4 | 840 kw. |
| 5 | 1140 kw. |
| 6 | 1440 kw. |

¹ The last station remains on the line even though the demand drop to zero.

In order to individually adjust the "add" and "remove" power levels of the individual generating stations, it is necessary to incorporate a circuit which changes the sensitivity of the power sensing or load demand sensing circuit 28 as a function of the number of generating stations that are connected to the electrical bus 18. A station counting means or circuit for performing this function is shown schematically in FIGURE 2. Contacts $LC1_a$ through $LC6_a$, $LC1_b$ through $LC6_b$, and $LC1_c$ through $LC6_c$ are contacts of the slave relays LC1 through LC6, which are responsive to the generator line contactors 16. The numerical reference of the individual contacts identifies the generating station with which the slave relay LC is associated. The letter reference on the individual contacts distinguishes the different contacts on each relay. The contacts of slave relays LC are shown in the position they assume when its associated line contactor 16 is tripped.

Figure 2:
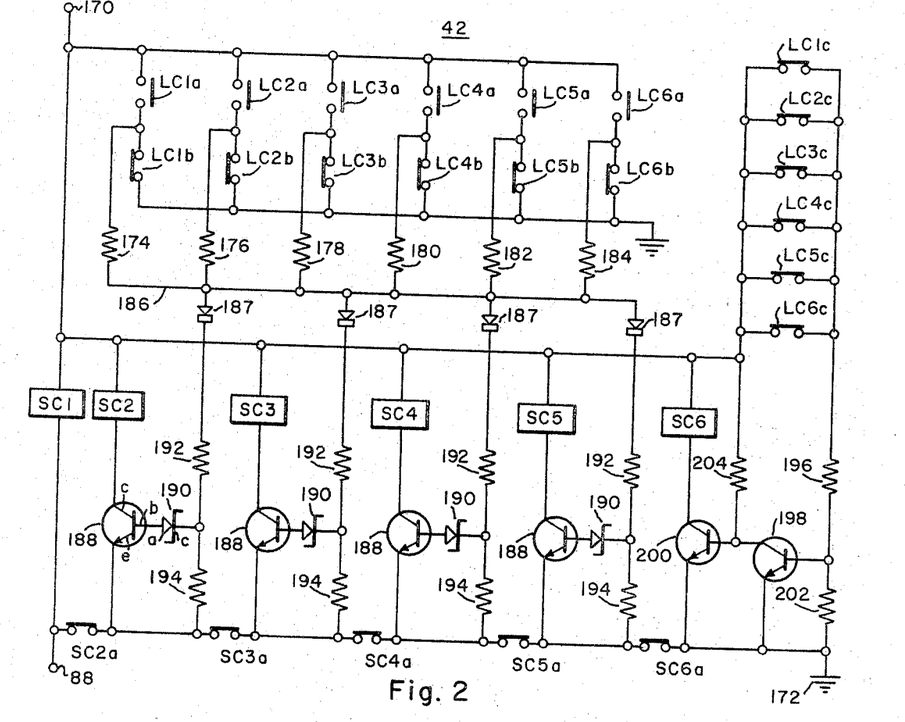
FIGURE 2 is a schematic diagram of a station count circuit.

When a direct current voltage having a magnitude "V" is applied to terminal 170 of station count circuit 42 from the source of direct current potential 165, station count relay SC1 will be energized and will remain energized until any one of the remaining station count relays, SC2 through SC6, are energized. When one of these additional station relays SC pick up, the ground return path of relay SC1 to ground 172 will be broken and station count relay SC1 will be de-energized. For example, if station count relay SC2 is energized, contact $SC2_a$ will be opened, thus breaking the ground connection of station count relay SC1.

Resistors 174, 176, 178, 180, 182 and 184 are connected to terminal 170 through normally open contacts $LC1_a$ through $LC6_a$, respectively, of slave relays LC1 through LC6. Resistors 174, 176, 178, 180, 182 and 184 are of substantially equal value, which we will assume to be R. If one of the LC contacts $LC1_a$ through $LC6_a$ closes, the voltage at conductor 186 will be:

$$\frac{V}{\frac{R}{5}+R} \times \frac{R}{5} = \frac{1}{6}V$$

This analysis assumes the load on the circuit is negligible with respect to the resistance magnitudes of resistors 174, 176, 178, 180, 182 and 184. Using voltage divider theory it can be seen that the voltage output of the circuit appearing at conductor 186 will increase by ⅙v. each time an additional contact $LC1_a$ through $LC6_a$ closes.

Four similar circuits, each including a station count relay SC, an amplifier, a voltage responsive rectifier, and voltage divider sense the magnitude of the potential at conductor 186 through a blocking rectifier. The first circuit includes a blocking rectifier 187, a station count relay SC2, a transistor 188, having a base electrode $b$, collector electrode $c$ and emitter electrode $e$, a voltage sensing device, such as a Zener diode 190, having an anode $a$ and a cathode $c$, and a voltage divider, including resistors 192 and 194. These components in the remaining three similar circuits are given like reference numerals, except for the station count relays, which are numbered consecutively.

As hereinbefore stated, the various circuits are interlocked with SC contacts $SC2_a$ through $SC6_a$ such that the ground return of a given circuit is interrupted whenever an SC relay with a higher SC number is energized.

The values of Zener diode 190, and resistors 192 and 194, associated with station count relay SC2, are adjusted such that the station count relay SC2 will not be energized when the applied voltage is ⅙v. (one station on the line) but will be energized when the applied voltage is ⅓v. (two stations on the line). With these components so adjusted and when two generating stations are connected to the electrical bus 18, the Zener diode 190 will conduct current in a direction from its cathode to its anode, causing transistor 188 to conduct current from its collector electrode $c$ to its emitter electrode $e$, which in turn causes station count relay SC2 to be energized. When station relay SC2 is energized, the ground return path for SC1 is interrupted, due to the opening of contacts $SC2_a$, causing station count relay SC1 to be de-energized. This results in only the station count relay corresponding to the number of stations on the line to be picked up, as each time a generating station is added or removed, the voltage on bus 186 changes ⅙v., causing a new SC relay to be energized, and de-energizing the previously energized SC relay.

Station count relay SC6 is energized when all generating stations are connected to the electrical bus 18. When all generating stations are connected to the electrical bus 18, all of the LC contacts $LC1_c$ through $LC6_c$ connected to the voltage dividing network comprising resistors 196 and 202, are open. Transistor 198 which had previously been conducting due to the potential applied to it through one or more of the contacts $LC1_c$ through $LC6_c$, will stop conducting, and transistor 200 will start to conduct due to the base drive potential now applied to its base electrode $b$ through resistor 204, causing station count relay SC6 to be energized. As long as the relays LC1 through LC6 indicate that at least one of the generating stations is not connected to the electrical bus 18, base drive would be supplied for transistor 198 through one of the contacts $LC1_c$ through $LC6_c$, with resistors 196 and 202 being selected to provide the proper base drive. Resistor 204 is provided to limit the current through transistor 198 and provide the desired base drive to transistor 200 when transistor 198 ceases to conduct.

Figure 3:
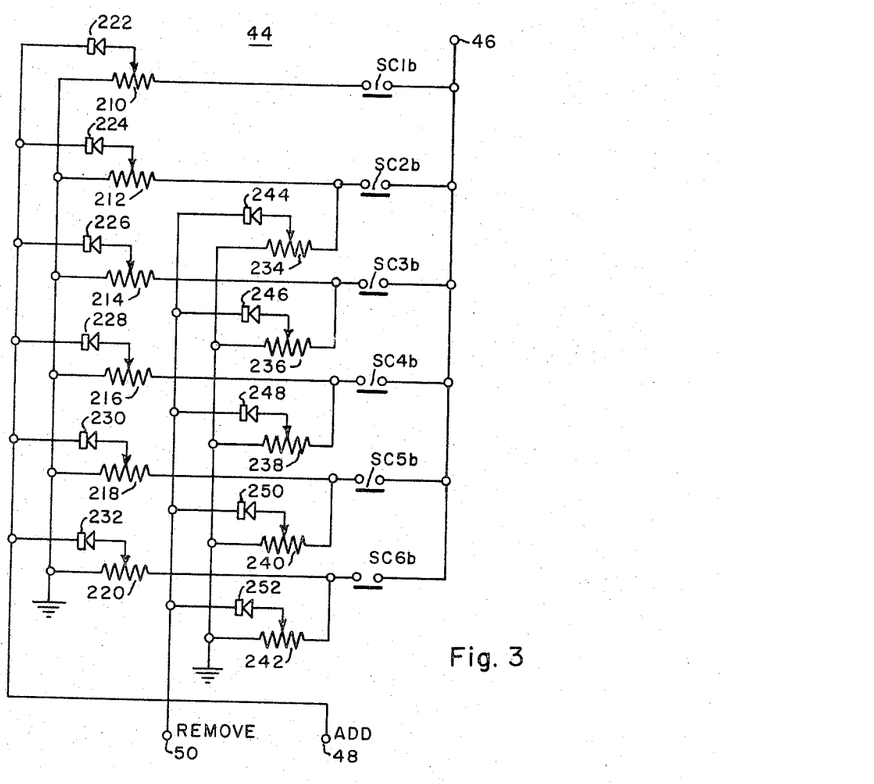
FIGURE 3 is a schematic diagram of a calibration circuit which operates in conjunction with the station count circuit shown in FIG. 2 to adjust the power level at which each station is added or removed.

Contacts $SC1_b$ through $SC6_b$ of station count relays SC1 through SC6, respectively, are connected to voltage dividers in the calibration network 44, as shown in FIG. 3. It will be remembered, that only the station count relay SC corresponding to the number of stations connected to the electrical bus 18 will be energized at any given time.

Voltage adjusting means or potentiometers 210, 212, 214, 216, 218 and 220 provide the adjustment for controlling the power level at which the individual generating stations I through VI are added, with potentiometer 210 adjusting the power level at which generating station number I is added, potentiometer 212 controlling the power level at which generating station number II is added, potentiometer 214 controlling the power level at which station number III is added, potentiometer 216 controlling the power level at which station number IV is added, potentiometer 218 controlling the power level at which station number V is added, and potentiometer 220 controlling the power level at which station number VI is added. Rectifiers 222, 224, 226, 228, 230 and 232 are for blocking purposes.

Potentiometers 234, 236, 238, 240 and 242 control the power levels at which the individual generating stations I through VI are removed from the electrical bus 18, with potentiometer 234 controlling the power level at which station number II is removed, potentiometer 236 controlling the power level at which station number III is removed, potentiometer 238 controlling the power level at which station number IV is removed, potentiometer 240 controlling the power level at which station number V is removed, and potentiometer 242 controlling the power level at which station number VI is removed. It will be noted that station number I does not have an adjustment for its removal, as station number I is not removed from the electrical bus 18, even when the power level drops to zero. Rectifiers 244, 246, 248, 250 and 252 are for blocking purposes.

Thus, when a contact of a station count relay SC closes, corresponding to the number of generating stations connected to the electrical bus 18, calibration network 44 provides a calibrated "add" signal at terminal 48 and a calibrated "remove" signal at terminal 50. These calibrated "add" and "remove" signals are responsive to the power demand of the electrical bus 18, with a signal proportional to the power demand being applied to the calibration network at terminal 46.

Figure 4:
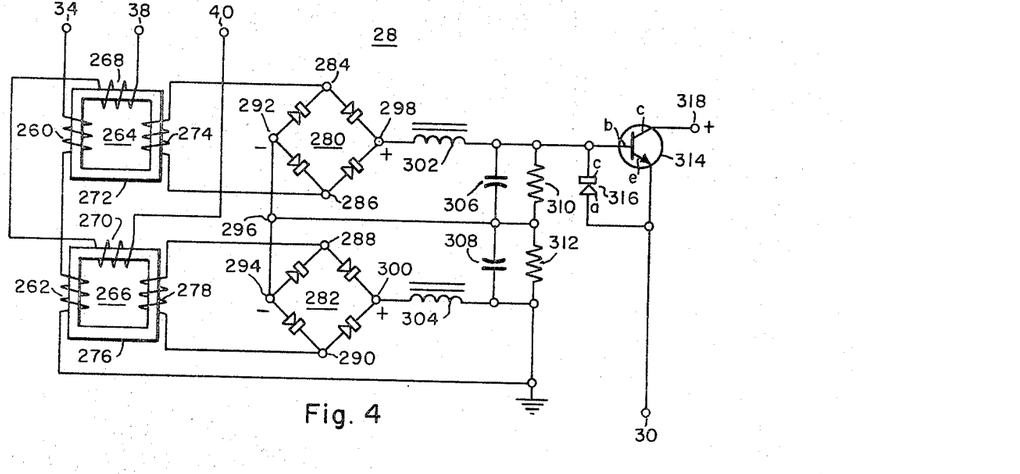
FIGURE 4 is a schematic diagram of a load demand sensing circuit which provides a unidirectional signal proportional to the load power demand.

Many different power sensing circuits may be utilized to provide a signal proportional to the power demand of load 26. A circuit that has been found to accurately supply a unidirectional output signal proportional to the real component of the load current is shown in FIG. 4. A signal proportional to system voltage is applied to terminal 34 of power sensing circuit 28, with this signal being applied to windings 260 and 262 of transformers 264 and 266, respectively. A signal proportional to system current is applied to terminals 38 and 40 of power sensing circuit 28, with this signal being applied to windings 268 and 270 of transformers 264 and 266, respectively. Windings 260 and 268 are wound on magnetic core 272 of transformer 264 to add vectorially, with the vector sum appearing in winding 274 of transformer 264. Windings 270 and 262 are wound on magnetic core 276 of transformer 266 such that their vector difference appears in winding 278 of transformer 266. The absolute magnitude of the vector sum in winding 274, and the absolute magnitude of the vector difference in winding 278 are obtained in single phase full wave rectifiers 280 and 282, respectively, with the vector sum from winding 274 being applied to input terminals 284 and 286 of rectifier 280, and the vector difference from winding 278 being applied to input terminals 288 and 290 of rectifier 282. In order to obtain the difference between the absolute magnitudes of the vector sum and vector difference, the negative output terminals 292 and 294 of rectifiers 280 and 282, respectively, are connected in common at point 296, and the positive output terminals 298 and 300 of rectifiers 280 and 282, respectively, are connected through suitable waveform filter circuits, comprising choke coils 302 and 304 and capacitors 306 and 308, to smooth the ripple in the rectified output voltages of rectifiers 280 and 282. The difference in the magnitudes of the outputs of rectifiers 280 and 282 appears across resistors 310 and 312. Resistors 310 and 312 are bleeder resistors for providing proper operation of the waveform filters.

In order to reduce the power dissipation and improve regulation, a current amplifier stage comprising an emitter coupled transistor 314 having emitter, collector, and base electrodes, $e$, $c$ and $b$, respectively, may be provided, with its base electrode $b$ being connected to be responsive to the difference between the outputs of rectifiers 280 and 282. In order to protect transistor 314 against reversed polarity, rectifier 316, having an anode $a$ and cathode $c$, may be connected with its anode $a$ connected to the emitter electrode $e$ of transistor 314, and its cathode $c$ connected to the base $b$ of transistor 314. When control voltage is applied to terminal 318, and the collector electrode $c$ of transistor 314, a unidirectional signal proportional to the real component of the load current will appear at the emitter electrode $e$ of transistor 314 and terminal 30.

As hereinbefore stated, calibration network 44 provides calibrated "add" and "remove" signals at its terminals 48 and 50, respectively, which are proportional to the load power demand signal applied to terminal 46 from terminal 30 of power sensing circuit 28. Output terminals 48 and 50 of calibration network 44 are connected to terminals 52 and 54, respectively, of add-remove amplifier 56, which is shown in detail in FIG. 5. The add-remove amplifier 56 advances the stepping switch SS after a predetermined time delay, when load demand sensing circuit 28 senses that a generating station must be added to or removed from, the electrical bus 18. The add-remove amplifier 56 operates the add-remove relay AR and it helps perform such functions as by-passing generating stations that are inoperative or already on the line when stations are to be added, and of by-passing stations already off the line when stations are to be removed. Add-remove amplifier 56 also helps perform the functions of disabling the "add" circuit after a station start signal has been initiated, in order to allow time for the selected station to be added to the electrical bus 18, and of preventing the stepping switch SS from advancing when all available stations are connected to the line.

Assuming there is a requirement for an additional generating station, the "add" signal applied to terminal 52 of add-remove amplifier 56 will then be of sufficient magnitude to cause Zener diode 330 to conduct current in its reverse direction, applying a signal to the base electrode $b$ of transistor 332. When transistor 332 conducts through resistor 334 the base drive from terminal 342, applied to the base electrode $b$ of transistor 336 through resistors 334 and 338 and rectifier 340, will be lost, and transistor 336, which had been in a conducting mode, will cease to conduct. Voltage will then appear across resistor 344 and capacitor 346 causing capacitor 346 to charge according to the time constant determined by the magnitude of resistor 344 and capacitor 346. After a time delay determined by the values of resistor 344, capacitor 346 and the brakedown voltage of Zener diode 348, base drive will be applied from terminal 342 to transistor 350 through resistor 344, blocking rectifier 352, and Zener diode 348. Transistor 350 will then conduct, allowing current to flow through the "add" coil ARA of latching relay AR. Relay AR thus latches in the "add" position when transistor 350 conducts.

Coil 356 of stepping switch SS is energized when transistor 350 conducts, by virtue of having one of its ends connected to control voltage through conductor 358 and its other end connected through rectifier 360 to the collector electrode $c$ of transistor 350. Thus, when transistor 350 conducts, it completes a circuit to ground 172' for both the AR relay and stepping switch SS. The stepping switch SS operates such that a driving spring is cocked and an interrupter contact SSC closes when coil 356 is energized. The stepping switch SS advances one position when coil 356 is de-energized. When coil 356 of stepping switch SS is energized, interrupter contact SSC of stepping switch SS closes, allowing current to be applied to the base electrode $b$ of transistor 336 through rectifier 362 and resistor 364. This causes transistor 336 to conduct and allows capacitors 346 to discharge. When capacitor 346 discharges, transistor 350 ceases to conduct and the coil 356 of stepping switch SS is de-energized, causing the stepping switch to advance one position. Coil ARA of add-remove relay AR is also de-energized when transistor 350 ceases to conduct, but it remains in the "add" position by virtue of its being a latching type relay.

When it is required to by-pass a generating station while adding a station, a signal will be applied to the terminal 84 through resistor 366. This causes transistor 350 to conduct, energizing coil 356 of stepping switch SS, and causing the stepping switch SS to advance to the next position. The signal applied to terminal 84, as will be hereinafter explained, is in the form of a pulse, with the stepping switch SS advancing one position for each pulse applied to terminal 84.

Figure 10:
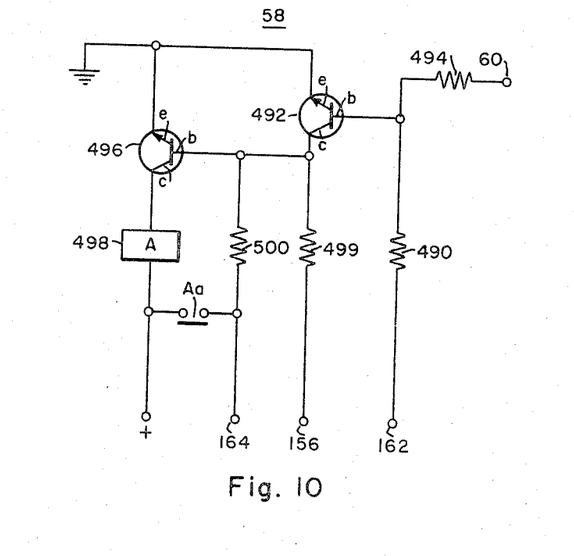
FIGURE 10 is a schematic diagram of an alarm circuit which provides a signal when there are no generating stations available and the load demand sensing circuit shown in FIG. 4 indicates another station is required.

When all available generating stations are on the line, the alarm relay A, located in the alarm circuit 58 shown in FIG. 10, is energized causing its contacts $A_b$, shown in FIG. 5, to close, connecting the junction of rectifiers 348 and 352 to ground 172". As long as the junction of rectifiers 348 and 352 is connected to ground 370, transistor 350 is unable to conduct and stepping switch SS is prevented from advancing.

In order to disable the "add" portion of the add-remove amplifier 56 during the period of time that a generating station is being added, a signal is applied to terminal 64 through rectifier 372. This causes transistor 336 to conduct and prevents capacitor 346 from charging. This prevents transistor 350 from conducting, and consequently prevents stepping switch SS from advancing.

If the load decreases to a level where one less generating station can adequately handle the load, the "remove" signal applied to terminal 54 drops to a value below the breakdown value of Zener diode 380, and Zener diode 380 ceases to conduct. This removes the base drive from the base electrode $b$ of transistor 382 and causes transistor 382 to stop conducting, which in turn causes transistor 384 to conduct, as base drive is then applied to the base electrode $b$ of transistor 384 through resistor 376 from terminal 342. When transistor 384 conducts, the base drive which had been applied to transistor 386 from terminal 342 through resistor 388 and rectifier 390 is removed. Transistor 386 then ceases to conduct and capacitor 392 is allowed to charge through resistor 394, with a time delay determined by the values of resistor 394 and capacitor 392. When the charge on capacitor 392 reaches the breakdown voltage of Zener diode 396, base drive is applied to the base electrode $b$ of transistor 398, and transistor 398 conducts. When transistor 398 conducts, current flows through the "remove" coil ARR of add-remove relay AR and coil 356 of stepping switch SS is energized through rectifier 401. When coil 356 of stepping switch SS is energized, interrupter contacts $SS_c$ close and a signal is applied to the base electrode $b$ of transistor 386 through conductor 358, interrupter contacts SSC, rectifier 402 and resistor 404. This base drive signal causes transistor 386 to conduct, discharging capacitor 392. Transistor 398 thus ceases to conduct which de-energizes the coil 356 of stepping switch SS, causing stepping switch SS to advance one position. Latching relay AR remains latched in the remove position, however, even though coil ARR is de-energized when transistor 398 ceases to conduct.

In order to by-pass a generating station that is already off the line when the load program control is in the "remove" mode, a signal is applied to terminal 80 through resistor 406 to the base electrode $b$ of transistor 398, setting up the sequence of events hereinbefore described, which causes transistor 398 to conduct, energizing the coil 356 of stepping switch SS, which causes stepping switch SS to advance one position when the coil 356 is de-energized.

As hereinbefore described, terminal 88 of station count circuit 42 is connected to ground 172 when only one generating station remains on the line. In order to disable the "remove" portion of add-remove amplifier 56, the junction of rectifiers 396 and 410 is grounded through rectifier 412 and terminal 86 by connecting terminal 86 of add-remove amplifier to terminal 88 of station counting circuit 42. With the junction of rectifiers 396 and 410 grounded, transistor 398 is unable to conduct and the "remove" portion of the add-remove amplifier 56 is disabled, even though the power demand by the load 26 may reduce to zero.

As hereinbefore stated, pulse forming circuit 90 generates a pulse or unidirectional voltage each time the stepping switch SS advances to a new position. FIG. 6 is a schematic diagram illustrating a pulse forming circuit that may be used. The stepping switch SS is shown in position number one, with stepping switch contacts $SS1_a$ being closed. Assume that stepping switch SS has been in position number one for a long period of time compared with the time constant of capacitor 420 and resistor 422. Current will flow through resistor 424 of the voltage dividing network comprising resistors 424 and 425, applying base drive to the base electrode $b$ of transistor 426, causing it to conduct and thus remove the base drive which had been applied to the base electrode $b$ of transistor 428 through resistor 427. Since we have assumed that enough time has elapsed for capacitor 420 to be fully charged, when transistor 428 ceases to conduct due to removal of its base drive, transistor 430 will conduct, with base drive being applied to its base electrode $b$ through resistor 422 and Zener diode 432. When transistor 430 conducts, the base drive signal which had been applied to transistor 434 through resistor 436 will be removed, causing transistor 434 to stop conduction and thus de-energize coil 438 of pulse relay PR. Now assume that stepping switch SS advances to position number two, which will cause contacts $SS2_a$ to close. During the time stepping switch SS is transferring, the voltage at conductor 440 will be zero. Thus, transistor 428 will conduct, causing capacitor 420 to discharge. When stepping switch SS arrives at position number two and contacts $SS2_a$ close, resistor 436 will supply base drive to transistor 434, causing the coil 438 of pulse relay PR to energize. The pulse relay PR remains energized for a period of time fixed by the values of resistor 422, capacitor 420 and Zener diode 432. When the charge on capacitor 420 reaches the breakdown voltage of Zener diode 432, and Zener diode conducts current in its reverse direction, transistor 430 will conduct, which removes the base drive from transistor 434, de-energizing coil 438 of relay PR, opening contact $PR_a$, and terminating the pulse. As stepping switch SS continues to advance, additional pulses are gnerated, one for each step.

Figure 7:
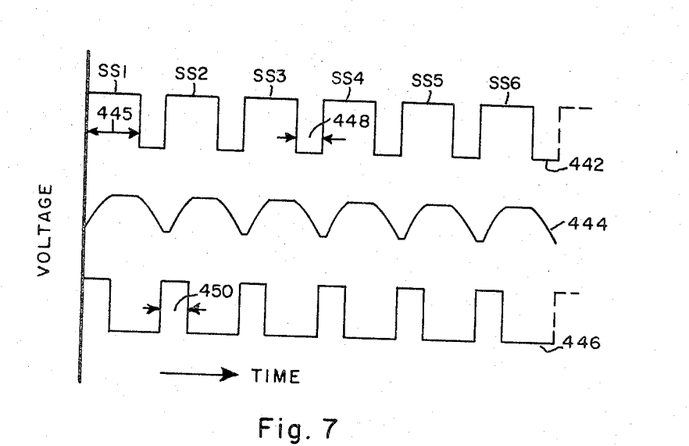
FIGURE 7 is a graph showing the voltage wave forms at different locations in the pulse forming circuit shown in FIG. 6.

FIG. 7 shows the waveforms at various points throughout pulse forming circuit 90. Waveform 442 illustrates the voltage across the stepping switch contacts $SS1_a$ through $SS6_a$. Waveform 444 illustrates the voltage across capacitor 420, and waveform 446 illustrates the waveform of the voltage applied to terminal 93 through contacts $PR_a$ of pulse relay PR. Portion 445 of waveform 442 illustrates the time the stepping switch SS is in one of its positions, and portion 448 of waveform 442 illustrates the time during which stepping switch SS is changing its position. The width 450 of waveform 446 illustrates the duration of the unidirectional pulse applied to terminal 93.

Figure 8:
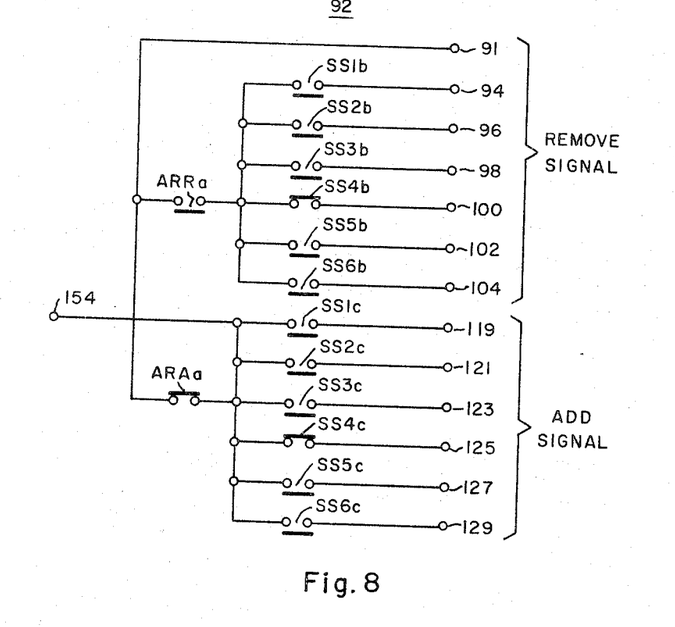
FIGURE 8 is a schematic diagram of an add-remove routing circuit which operates in conjunction with the add-remove amplifier shown in FIG. 5 to direct the pulse from the pulse forming circuit shown in FIG. 6 to the proper output.

The pulse formed by pulse forming circuit 90, shown in FIG. 6, is applied from its output terminal 93 to terminal 91 of the add-remove routing circuit 92. The add-remove routing circuit 92 is shown in FIG. 8, and includes contacts $ARA_a$ and $ARR_a$ of the add-remove relay AR shown in FIG. 5, and contacts $SS1_b$ through $SS6_b$, and $SS1_c$ through $SS6_c$ of the stepping switch SS, also shown in FIG. 5. If the "add" coil ARA of the add-remove relay AR is energized, contacts $ARA_a$ are closed, routing the pulse from terminal 91 to stepping switch contacts $SS1_c$ through $SS6_c$. If "remove" coil ARR of add-remove relay AR is energized, contacts $ARR_a$ will be closed, routing the pulse from terminal 91 to stepping switch contacts $SS1_b$ through $SS6_b$. The "add" contacts $SS1_c$ through $SS6_c$ of stepping switch SS are connected to terminals 119, 121, 123, 125, 127 and 129 with these terminals being connected to terminals 142, 144, 146, 148, 150 and 152, respectively, as shown in FIG. 1, which go to the respective control panels, designated generally by numeral 20 in FIG. 1, for the drives and generating stations I through VI. Terminals 119, 121, 123, 125, 127 and 129 are also connected to terminals 130, 132, 134, 136, 138 and 140, of logic routing circuits 66, 68, 70, 72, 74 and 76, respectively. The "remove" terminals of stepping switch $SS1_b$ through $SS6_b$ are connected to output terminals 94, 96, 98, 100, 102 and 104, which are in turn connected to output terminals 118, 120, 122, 124, 126 and 128, as shown in FIG. 1, which are connected to the respective control panels, designated generally by the numeral 20 in FIG. 1A, for the generating stations I through VI. Output terminals 94, 96, 98, 100, 102 and 104 are also connected to terminals 106, 108, 110, 112, 114 and 116 of logic routing circuits 66, 68, 70, 72, 74 and 76, respectively. Thus, if add-remove relay AR has its coil ARA energized, indicating that a station is to be added, and the stepping switch SS is on station number four with its contacts $SS4_c$ closed, the unidirectional pulse applied to terminal 91 will be directed through contacts $ARA_a$ of add-remove relay AR and through contacts $SS4_c$ of stepping switch SS. The signal will then be applied from terminal 125 of add-remove routing circuit 92 to terminal 148 and to the control 20 for the drives and generators. In like manner, if a generating station is to be removed, contacts $ARR_a$ will be closed, routing the pulse from terminal 91 to the selected station through stepping switch contacts $SS1_b$ through $SS6_b$.

Logic routing circuits 66, 68, 70, 72, 74 and 76 are all similar in function, so it will be necessary to describe only one of the logic routing circuits, such as logic routing circuit 66. Logic routing circuit 66, shown in FIG. 9, senses the position of the add-remove relay AR, the stepping switch SS, the line contactor slave relay LC1, and the lock-out relay LO1, and directs signals to other circuits to perform the various auxiliary functions of the load demand program control.

Figure 9:
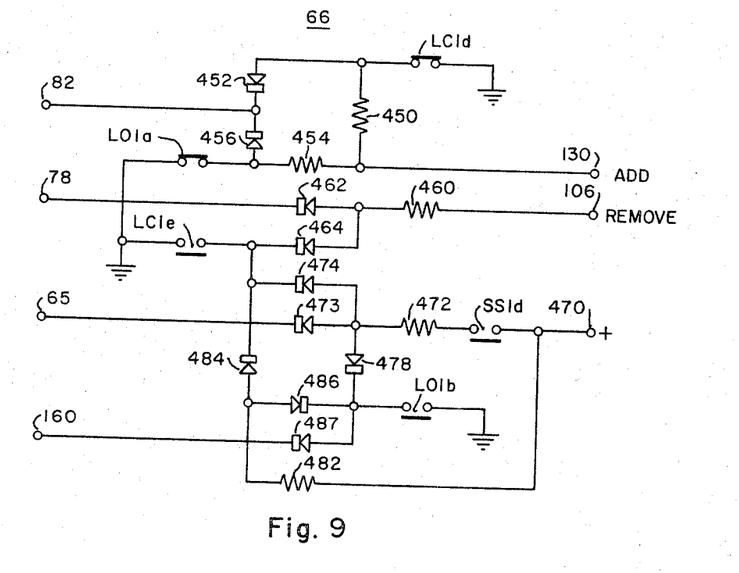
FIGURE 9 is a schematic diagram of a logic routing circuit which directs the signals obtained from the add-remove routing circuit of FIG. 8 to the proper station.

One of the functions of the logic routing circuit is to determine when a generating station is to be by-passed, when a station or stations are to be added to the electric bus 18. As hereinbefore described, when a signal is applied to terminal 84 of add-remove amplifier 56 shown in FIG. 5, the selector switch SS will be advanced to the next position. The signal for by-passing a generating station is applied to terminal 84 of add-remove amplifier 56 from terminal 82 of logic routing circuit 66, or the corresponding terminals from the remaining logic circuits. The load program control must by-pass a generating station when the generating station is already on the line, signalled by the LC relay responsive to the particular line contactor 16 being closed, or when the generating station is inoperative, signalled by the lock-out relay LO being energized. Assume that a pulse appears at terminal 130, indicating that a station is to be added. If contacts $LC1_d$ of slave relay LC1, and contacts $LO1_a$ of lock-out relay LO1 are as shown, the pulse applied to terminal 130 will be shunted to the ground through resistors 450 and 454, and no output will appear at terminal 82. Contacts $LC1_d$ and $LO1_a$ will be in the position shown when generating station number one is not connected to the electrical bus 18, and the generating station is operative. On the other hand, if contact $LC1_d$ is open, indicating the generating station is already on the line, or if the contact $LO1_a$ is open, indicating the generating station is inoperative, the pulse will be routed through resistor 450 and rectifier 452, or resistor 454 and rectifier 456, to terminal 82. As hereinbefore stated, when a pulse appears at terminal 82 it is applied to terminal 84 of add-remove amplifier 56, and stepping switch SS will be advanced one position. When generating stations are to be removed from the electrical bus 18, the generating stations already off the line are to be by-passed. This by-pass signal is applied to terminal 80 of add-remove amplifier 56, which causes stepping switch SS to advance one position. The signal applied to terminal 80 of add-remove amplifier 56 is obtained from terminal 78 of logic routing circuit 66 and from similar terminals of the remaining logic routing circuits. Assume that a pulse appears at terminal 106, indicating that station number one is to be removed. If contacts $LC1_e$ are in the position shown, indicating that station number one is already off the line, the pulse will be directed through resistor 460 and rectifier 462 to terminal 78. On the other hand, if contacts $LC1_e$ are closed, indicating that station number one is on the line, the pulse applied to terminal 106 will be shunted to ground through rectifier 464. Thus, if generating station number one is on the line and a "remove" signal is applied to terminal 106, no signal will appear at terminal 78. This allows the selector switch to remain in position number one and station number one will be removed from the line. However, if generating station number one is already off the line, the pulse applied to terminal 106 will be applied through terminal 80 of add-remove amplifier 56, causing the stepping switch SS to advance to the next position.

Another function of logic routing circuit 66 is to wait a predetermined period of time after a start signal has been initiated to determine whether or not the station selected will come on the line and provide its share of the load. This feature is necessary since it may take several minutes from the time the start signal is issued until the generating station assumes its share of the load. Without this feature all of the remaining stations would be added during the station start interval.

Assume that the stepping switch SS steps into position one, and an "add" signal is applied to terminals 130 and 142 indicating that station number one is to be added. Voltage is applied to input terminal 470 from source of direct current potential 165, and since contacts $SS1_d$ will be closed, if contacts $LC1_e$ and $LO1_b$ are as shown, an output signal will be applied to terminal 65 through resistor 472 and rectifier 473. This output signal is then applied to terminal 64 of add-remove amplifier 56. As long as an output appears at terminal 65 of logic routing circuit 66, the add sensing circuit in the add-remove amplifier 56 will be disabled in a manner hereinbefore described. The signal will remain at terminal 65 until either the contacts $LC1_e$ close, indicating that line contactor 16 is closed, connecting generating station number one to the line, or contacts $LO1_b$ close, indicating that generating station number one has failed to come on the line within a predetermined time interval. If generating station number one comes on the line, contacts $LC1_e$ will close, shunting the signal from terminal 470, through contacts $SS1_d$, through resistor 472, and through rectifier 474 to ground. If the generating station fails to come on the line, contacts $LO1_b$ will shunt the signal through rectifier 478 to ground.

When all available stations are connected to electrical bus 18, the alarm circuit 58, shown in FIG. 10, should be "armed." The absence of a signal at terminal 162 of alarm circuit 58 "arms" the alarm circuit. The absence of a signal at terminal 162 indicates that all available generators are connected to the electrical bus 18. An available generator is defined as a generator which is not inoperative or locked out. A signal will be present at terminal 162 as long as both of the following conditions exist at one or more of the generating stations: the station is not on the line, and the lock-out relay of that station is not energized. Terminal 162 of alarm circuit 58 is energized by terminals 160 of logic routing circuits 66, 68, 70, 72, 74 and 76. There will be no signal at terminal 160 of each logic routing circuit when either of the following conditions exist: the station is on the line, or the lock-out relay of that station is energized. Current will flow from terminal 470 through resistor 482 and rectifier 484, and if contact $LC1_e$ is closed, indicating the station is connected to bus 18, this current is shunted to ground. If contact $LO1_b$ is closed, the current will also be shunted to ground through rectifier 486. Thus, if all generating stations are either on the line or locked out, there will be no signal applied to terminal 162 of alarm circuit 58, and the alarm will be "armed." If the station is not on the line and is not locked out, a signal will be applied to terminal 160 through resistor 482 and rectifiers 486 and 487.

A suitable alarm circuit 58 is shown in FIG. 10. Alarm circuit 58 energizes the alarm relay A when a generating station is not available and the load demand is such that an additional generating station is required. The energized alarm relay A may be used to operate an audio or visual indicator, such as alarm 163 shown in FIG. 1A, or it may remove the load.

Assume that all of the available stations are connected to the electrical bus 18, which arms the alarm as there will be no signal applied to terminal 162 of alarm circuit 58, as hereinbefore explained. Thus, no current will flow through resistor 490. Further, assume that an additional station is required to satisfy the load demand. Under this condition transistor 332 shown in add-remove amplifier 56 of FIG. 5 will conduct, causing the current through resistor 334 to be shunted to ground. Therefore, no current will flow from terminal 62 of add-remove amplifier 56 to terminal 60 of alarm circuit, and no current will be applied to the base electrode $b$ of transistor 492 through resistor 494.

When the "add" time delay has elasped, the "add" pulse appears at terminal 154 of add-remove routing circuit 92 shown in FIG. 8. This pulse is applied to terminal 156 of alarm circuit 58 and to the base electrode $b$ of transistor 496 through resistor 499, causing transistor 496 to conduct and the coil 498 of alarm relay A to energize. Once relay coil 498 of alarm relay A is energized, transistor 496 is kept in the conducting state by current flowing through relay contact $A_a$ and resistor 500. When the load demand reduces to a level where an additional station is not required, transistor 332 of add-remove amplifier 56 stops conducting and a signal is applied to terminal 62 of add-remove amplifier 56 and thus to terminal 60 of alarm circuit 58. This provides base drive to base electrode $b$ of transistor 492, causing it to conduct. This removes the base drive signal from transistor 496, transistor 496 ceases to conduct, and relay coil 498 of the alarm relay A is de-energized. It should be noted that alarm relay A cannot be energized unless the circuit is armed by an absence of a signal at its terminal 162. It should also be noted that a contact $A_b$ of alarm relay A disables the "add" circuit when the alarm relay A is energized. This contact $A_b$ is shown in the add-remove amplifier 56 of FIG. 5.

The schematic diagrams illustrated and described herein have been simplified by eliminating components which are well known and understood in the art, for example, base to emitter resistors have been eliminated from the transistors, and in cases where multiple stages of transistors are required for current gain only, the amplifier is shown as a single transistor. Also, blocking diodes required to make multi-use of a single set of contacts have been eliminated.

Thus, there has been disclosed a new and improved load demand program control which maintains the most economical operating condition of a multi-station, on-site, electrical power generation system, which in addition to adding and removing electrical generating stations at predetermined power levels, also provides time delays in the "add" and "remove" circuits to override load transients, waits a predetermined time after signalling a generating station to start to see if the station satisfies the load before adding additional stations, by-passing inoperative stations when adding or removing stations, by-passes stations already on the line when adding stations, replaces a failed station with the next available station, and generates an alarm signal whenever all available stations are on the line and additional generator capacity is required.

Since numerous changes may be made in the above-described apparatus and different embodiments of the invention may be made without departing from the spirit thereof, it is intended that all matter contained in the foregoing description or shown in the accompanying drawings shall be interpreted as illustrative, and not in a limiting sense.

I claim as my invention:
1. A load demand program control for adding to and removing electrical generating stations from an electrical bus connected to a load in response to load power demand, comprising:
    first means including power sensing means providing a first signal responsive to the power required by the load,
    second means connected in circuit relation with said power sensing means providing second and third signals responsive to the first signal and calibrated according to the number of generating stations connected to the electrical bus,
    third means connected in circuit relation with said second means, providing an "add" signal when the second signal reaches a predetermined magnitude, and providing a "remove" signal when said third signal falls below a predetermined magnitude,
    fourth means having a single stepping switch having a plurality of positions corresponding to the number of generating stations, and "add" and "remove" latch relays, said fourth means being connected in circuit relation with said third means, with said add and remove latch relays being responsive to said add and remove signals, respectively, said add and remove latch relays advancing said stepping switch one position when either is energized by said add and remove signals, respectively,
    and fifth means connected in circuit relation with said fourth means which provides a pulse signal each time said stepping switch is advanced to a new position, said pulse signal being directed by said add or remove latch relays to the generating station selected by said stepping switch.
2. The load demand program control of claim 1 wherein said second means includes means for calibrating said second and third signals as a function of the number of the generating stations connected to the electrical bus, such that the power magnitude at which each generating station is added to or removed from the electrical bus may be individually controlled according to the number of connected generating stations.
3. The load demand program control of claim 1 wherein said second means includes station counting means which disables the remove function of said fourth means by preventing the remove latch relay from being energized when only one generating station is connected to the bus.
4. The load demand program control of claim 1 including logic means responsive to which generating stations are connected to the electrical bus, which generating stations are available to be connected, and which generating stations are inoperative, said logic means being connected in circuit relation with said fourth means and advancing said stepping switch one position to another generating station when the selected station is not available to be added to the electrical bus when an "add" signal is provided by said third means, and when the selected generating station is not connected to the electrical bus when a "remove" signal is provided by said third means.

5. The load demand program control of claim 1 including alarm means for providing an alarm signal when all available generating stations are connected to the electrical bus and said third means provides an "add" signal, said alarm means being connected in circuit relation with said fourth means, said fifth means, and said logic means, said alarm means providing an alarm signal when said logic means indicates all available generating stations are connected to the electrical bus, an add signal is received by said fourth means, and said fifth means provides a pulse signal in response to the add signal received by said fourth means.

References Cited

UNITED STATES PATENTS

| | | | |
|---|---|---|---|
| 1,789,155 | 1/1931 | Peterson | 307—81 |
| 1,808,543 | 6/1931 | Gittings | 307—81 X |
| 3,235,743 | 2/1966 | Ryerson | 307—81 X |

ORIS L. RADER, *Primary Examiner.*

T. J. MADDEN, *Assistant Examiner.*